(12) United States Patent
Hart et al.

(10) Patent No.: US 8,277,320 B1
(45) Date of Patent: Oct. 2, 2012

(54) FACILITATING A GAME THAT OPERATES WITHIN A SOCIAL-NETWORKING APPLICATION

(75) Inventors: Matt Eric Hart, Lunenburg, MA (US); Kira Wampler, Mountain View, CA (US); Mark F. Keavney, San Jose, CA (US)

(73) Assignee: Intuit Inc., Mountain View, CA (US)

( * ) Notice: Subject to any disclaimer, the term of this patent is extended or adjusted under 35 U.S.C. 154(b) by 851 days.

(21) Appl. No.: 12/247,573

(22) Filed: Oct. 8, 2008

(51) Int. Cl.
*A63F 9/24* (2006.01)
(52) U.S. Cl. .......................................................... 463/42
(58) Field of Classification Search ...................... 463/42
See application file for complete search history.

(56) References Cited

U.S. PATENT DOCUMENTS

| | | | | |
|---|---|---|---|---|
| 4,887,818 | A * | 12/1989 | Escott | 273/254 |
| 2001/0034643 | A1 * | 10/2001 | Acres | 705/14 |
| 2004/0259641 | A1 * | 12/2004 | Ho | 463/42 |
| 2006/0287099 | A1 * | 12/2006 | Shaw et al. | 463/42 |
| 2007/0173324 | A1 * | 7/2007 | Multerer et al. | 463/42 |
| 2007/0173325 | A1 * | 7/2007 | Shaw et al. | 463/42 |
| 2009/0170610 | A1 * | 7/2009 | Herrmann et al. | 463/43 |

OTHER PUBLICATIONS

"Guide to Forming Alliances" (webpage), Jun. 8, 2007.*
"Merging Guilds" (webpage), Nov. 30, 2007.*
"To Merge or not to Merge" (webpage), Mar. 6, 2006.*
"World of Warcraft Wiki—Guilds", Jan. 3, 2007.*
World of Warcraft Manual 2004.*

* cited by examiner

*Primary Examiner* — Xuan Thai
*Assistant Examiner* — Michael Grant
(74) *Attorney, Agent, or Firm* — Park, Vaughan, Fleming & Dowler LLP

(57) ABSTRACT

One embodiment of the present invention provides a system for facilitating a game that operates within a social-networking application. During operation, the system receives a request from a user to participate in a game that is running within the social-networking application, wherein the request is received at the game. Next, in response to the request, the system adds the user to the game. The system then receives a notification at the game that the user has performed an action within the social network. Next, in response to the notification, the system determines a point value assigned to the action. Finally, the system increments a score associated with the user by the point value.

18 Claims, 8 Drawing Sheets

FACILITATING A GAME THAT OPERATES WITHIN A SOCIAL-NETWORKING APPLICATION

BACKGROUND

Related Art

Because of the recent explosion in popularity of social-networking applications, many advertisers are trying to use these social-networking applications as a source of revenue by advertising within the social-networking applications. While these social-networking applications can increase the effectiveness of advertising by enabling the advertiser to display advertisements to specific targeted interest groups, they still encounter many of the same problems associated with traditional web-based advertising.

For example, as web technologies continue to improve, so do pop-up blockers and advertisement blockers. Hence, even if a specific web-page is programmed to deliver an advertisement to a target group, there is no way to guarantee that the browsers of members of the target group will actually display the advertisement.

SUMMARY

One embodiment of the present invention provides a system for facilitating a game that operates within a social-networking application. During operation, the system receives a request from a user to participate in a game that is running within the social-networking application, wherein the request is received at the game. Next, in response to the request, the system adds the user to the game. The system then receives a notification at the game that the user has performed an action within the social network. Next, in response to the notification, the system determines a point value assigned to the action. Finally, the system increments a score associated with the user by the point value.

In some embodiments of the present invention, the system receives a second request from the user of the game to join a group. Next, in response to the second request, the system adds the user to the group. Finally, the system increments a score associated with the group by the score associated with the user, such that the score associated with the group is a sum of the scores associated with the users in the group.

In some embodiments of the present invention, the system receives a takeover request from the user at the game, wherein the takeover request specifies the group associated with the user and a target group. Next, the system determines if the group meets a takeover criteria by determining if the score associated with the group exceeds a takeover score which is comprised of a score associated with the target group incremented by a predetermined threshold. If so, the system combines the group and the target group within the social-networking application. However, if not, the system rejects the takeover request.

In some embodiments of the present invention, the system determines if the group meets the takeover criteria by creating a takeover deadline. Next, the system notifies members of the target group of: the takeover request, the takeover score, and the takeover deadline. Finally, the system determines if the score associated with the target group is below the takeover score at the takeover deadline.

In some embodiments of the present invention, the system periodically ends the game and starts a new game by resetting the score associated with the user, and eliminating a group membership of the user.

In some embodiments of the present invention, the system carries over a percentage of the score associated with the user from the game to the new game.

In some embodiments of the present invention, the action can include viewing an advertisement.

In some embodiments of the present invention, the system determines if the score associated with the user has reached a predetermined amount. If so, the system presents the user with a discount on a product outside of the game.

In some embodiments of the present invention, the system determines if the score associated with the user has reached a predetermined rank compared to scores associated with other users. If so, the system presents the user with a discount on a product outside of the game.

BRIEF DESCRIPTION OF THE FIGURES

The patent or application file contains at least one drawing executed in color. Copies of this patent or patent application publication with color drawing(s) will be provided by the Office upon request and payment of the necessary fee.

DETAILED DESCRIPTION

Figure 1:
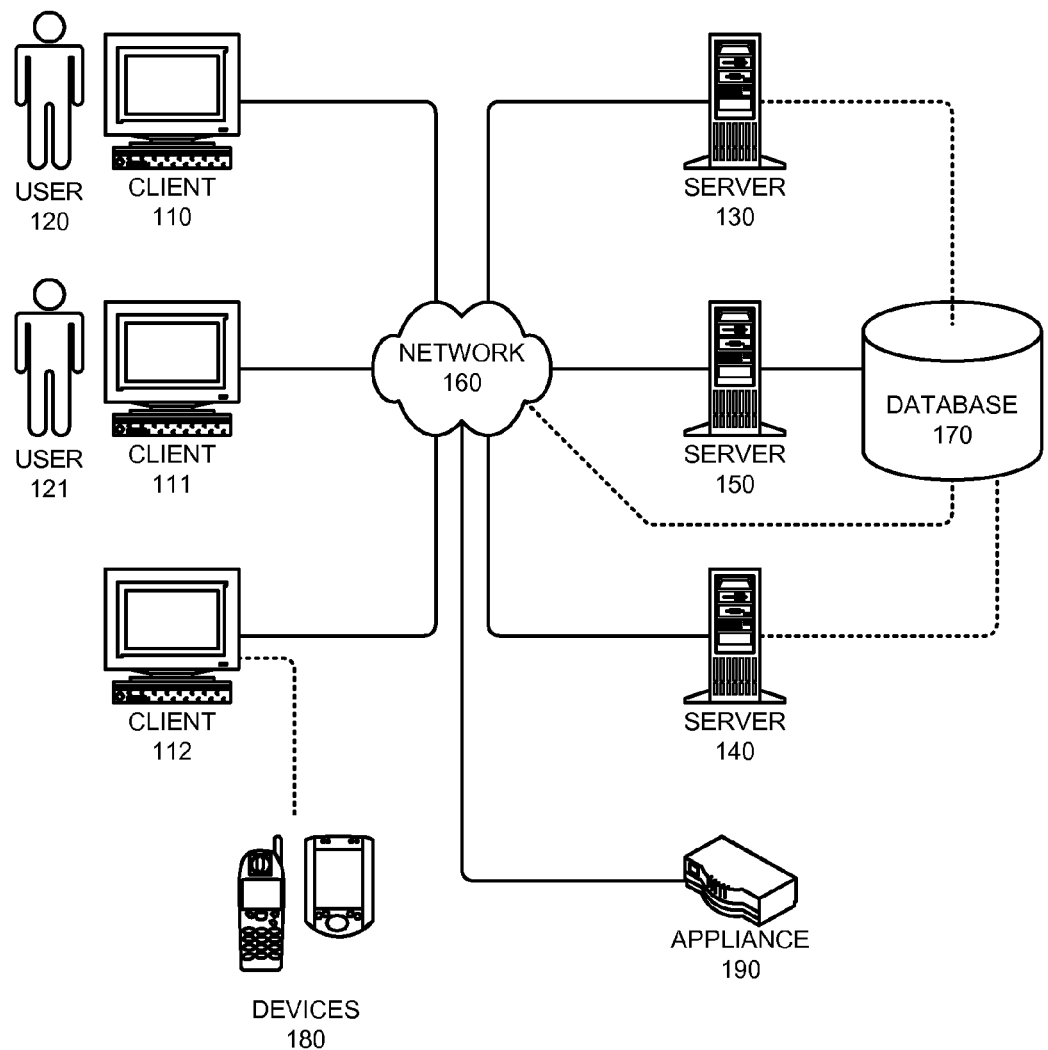
FIG. 1 illustrates a computing environment in accordance with an embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

Overview

One embodiment of the present invention provides a system for facilitating a game that operates within a social-networking application. During operation, the system receives a request from a user to participate in a game that is running within the social-networking application, wherein the request is received at the game. Next, in response to the request, the system adds the user to the game. The system then receives a notification at the game that the user has performed an action within the social network. Next, in response to the notification, the system determines a point value assigned to the action. Finally, the system increments a score associated with the user by the point value.

Note that the social-networking application can include any social-networking application or social-networking service, such as Facebook, MySpace, LinkedIn, Bebo, HiS, Orkut, Cyworld, Friendster, etc. Embodiments of the present invention leverage existing social network infrastructures to facilitate the game and to thereby drive targeted advertising.

In some embodiments of the present invention, the system receives a second request from the user at the game to join a group. Next, in response to the second request, the system adds the user to the group. Finally, the system increments a score associated with the group by the score associated with the user, such that the score associated with the group is a sum of the scores associated with all of the users in the group.

Note that in some embodiments of the present invention, groups have additional features beyond the aggregate score of the member users. For example, in some embodiments a group may comprise a fictitious company, and may include a company name, company officers, and a company valuation. The company valuation may simply be the same as the score associated with the group, or may be some fraction of the score associated with the group. Furthermore, the group, and subsequently the company valuation, may comprise multiple scores based on different types of actions and events.

In some embodiments of the present invention, the system receives a takeover request from the user at the game, wherein the takeover request specifies the group associated with the user and a target group. Next, the system determines if the group meets a takeover criteria by determining if the score associated with the group exceeds a takeover score, which is comprised of a score associated with the target group incremented by a predetermined threshold. If so, the system combines the group and the target group within the social-networking application. However, if not, the system rejects the takeover request.

In these embodiments, a group can only take over another group if the score associated with that group exceeds the score associated with the target group by some predetermined threshold. Much like a business takeover in a real economy, a company typically needs to have a valuation sufficiently greater than a target company in order to take over or acquire the target company. Note that the predetermined threshold can be periodically changed by administrators, as well as dynamically adjusted according to game statistics. For example, the threshold can be inversely proportional to the number of active groups, such that as the number of groups declines, the threshold for taking over a group increases.

In some embodiments of the present invention, the system determines if the group meets the takeover criteria by creating a takeover deadline. Next, the system notifies members of the target group of: the takeover request, the takeover score, and the takeover deadline. Finally, the system determines if the score associated with the target group is below the takeover score at the takeover deadline.

By specifying a deadline and notifying the members of the target group, the system allows the target group a chance to avoid being acquired by the group initiating the takeover bid. However, in some embodiments of the present invention, the takeover score may increase as the group that is attempting to make the takeover increases their score. In this manner, the system can facilitate a lively competition between the two groups.

In some embodiments of the present invention, the system periodically ends the game and starts a new game by resetting the score associated with the user, and eliminating a group membership of the user. Note that games can run for specific periods, such as weekly, monthly, quarterly, etc. However, in some embodiments of the present invention, the game runs indefinitely.

In some embodiments of the present invention, the system carries over a percentage of the score associated with the user from the game to the new game. This allows winning groups to hold some advantage in a subsequent game. The percentage can be set by an administrator, or can be dynamically adjusted based on game statistics. Note that similarly, the system can keep track of an "all-time" score for each user that is the sum of the score for the user for each game the user participated in.

In some embodiments of the present invention, the action can include viewing an advertisement. Note that any action or event that is captured by the social-networking application can be assigned a score. While this can include actions such as taking quizzes, viewing profiles, uploading pictures, etc., it can also include viewing advertisements and clicking on advertising links. In some embodiments of the present invention, retailers can provide purchase codes upon the successful purchase of an item that can be submitted to the game for points.

Also note that in some embodiments of the present invention, the action can be an action that is associated with the user, but is performed by a second user. For example, the action can include a second user viewing the user's profile.

In some embodiments of the present invention, the system determines if the score associated with the user has reached a predetermined amount. If so, the system presents the user with a discount on a product outside of the game.

Note that rewarding users (and groups of users) for obtaining pre-determined scores may further promote interest in the game. If the rewards are for tangible goods or services outside of the social-networking application, there may be even more incentive for users to participate. For example, consider the situation where a user is playing the game in the context of a paid social-networking application. If one of the prizes that the user can obtain is a discount for the paid social-networking application, such as a free month of service, the user may be increasingly motivated to participate in the game.

Note that these rewards may be given to users and groups irrespective of the outcome of the game. For example, the winning user or group may receive a reward in addition to everyone that reached a predetermined score receiving a reward.

In some embodiments of the present invention, the system determines whether the score associated with the user has reached a predetermined rank compared to scores associated with other users. If so, the system presents the user with a discount on a product outside of the game.

Computing Environment

FIG. 1 illustrates a computing environment 100 in accordance with an embodiment of the present invention. Computing environment 100 includes a number of computer systems, which can generally include any type of computer system based on a microprocessor, a mainframe computer, a digital signal processor, a portable computing device, a personal organizer, a device controller, or a computational engine within an appliance. More specifically, referring to FIG. 1, computing environment 100 includes clients 110-112, users 120 and 121, servers 130-150, network 160, database 170, devices 180, and appliance 190.

Clients 110-112 can include any node on a network including computational capability and including a mechanism for communicating across the network. Additionally, clients 110-112 may comprise a tier in an n-tier application architecture, wherein clients 110-112 perform as servers (servicing requests from lower tiers or users), and wherein clients 110-112 perform as clients (forwarding the requests to a higher tier).

Similarly, servers 130-150 can generally include any node on a network including a mechanism for servicing requests from a client for computational and/or data storage resources. Servers 130-150 can participate in an advanced computing cluster, or can act as stand-alone servers. In one embodiment of the present invention, server 140 is an online "hot spare" of server 150.

Users 120 and 121 can include: an individual; a group of individuals; an organization; a group of organizations; a computing system; a group of computing systems; or any other entity that can interact with computing environment 100.

Network 160 can include any type of wired or wireless communication channel capable of coupling together computing nodes. This includes, but is not limited to, a local area network, a wide area network, or a combination of networks. In one embodiment of the present invention, network 160 includes the Internet. In some embodiments of the present invention, network 160 includes phone and cellular phone networks.

Database 170 can include any type of system for storing data in non-volatile storage. This includes, but is not limited to, systems based upon magnetic, optical, or magneto-optical storage devices, as well as storage devices based on flash memory and/or battery-backed up memory. Note that database 170 can be coupled: to a server (such as server 150), to a client, or directly to a network.

Devices 180 can include any type of electronic device that can be coupled to a client, such as client 112. This includes, but is not limited to, cell phones, personal digital assistants (PDAs), smart-phones, personal music players (such as MP3 players), gaming systems, digital cameras, portable storage media, or any other device that can be coupled to the client. Note that in some embodiments of the present invention, devices 180 can be coupled directly to network 160 and can function in the same manner as clients 110-112.

Appliance 190 can include any type of appliance that can be coupled to network 160. This includes, but is not limited to, routers, switches, load balancers, network accelerators, and specialty processors. Appliance 190 may act as a gateway, a proxy, or a translator between server 140 and network 160.

Note that different embodiments of the present invention may use different system configurations, and are not limited to the system configuration illustrated in computing environment 100. In general, any device that is capable of communicating via network 160 may incorporate elements of the present invention.

For example, in some embodiments of the present invention, user 120 accesses a game operating within a social-networking application being served from server 150 and database 170. Note that user 120 can access the game from any device that is coupled to network 160, such as client 110 and devices 180. Furthermore, user 120 may compete in a group that includes user 121, or may compete against user 121. Note that the game mechanics are described below in the description of FIGS. 4A-4E.

Apparatus

Figure 2:
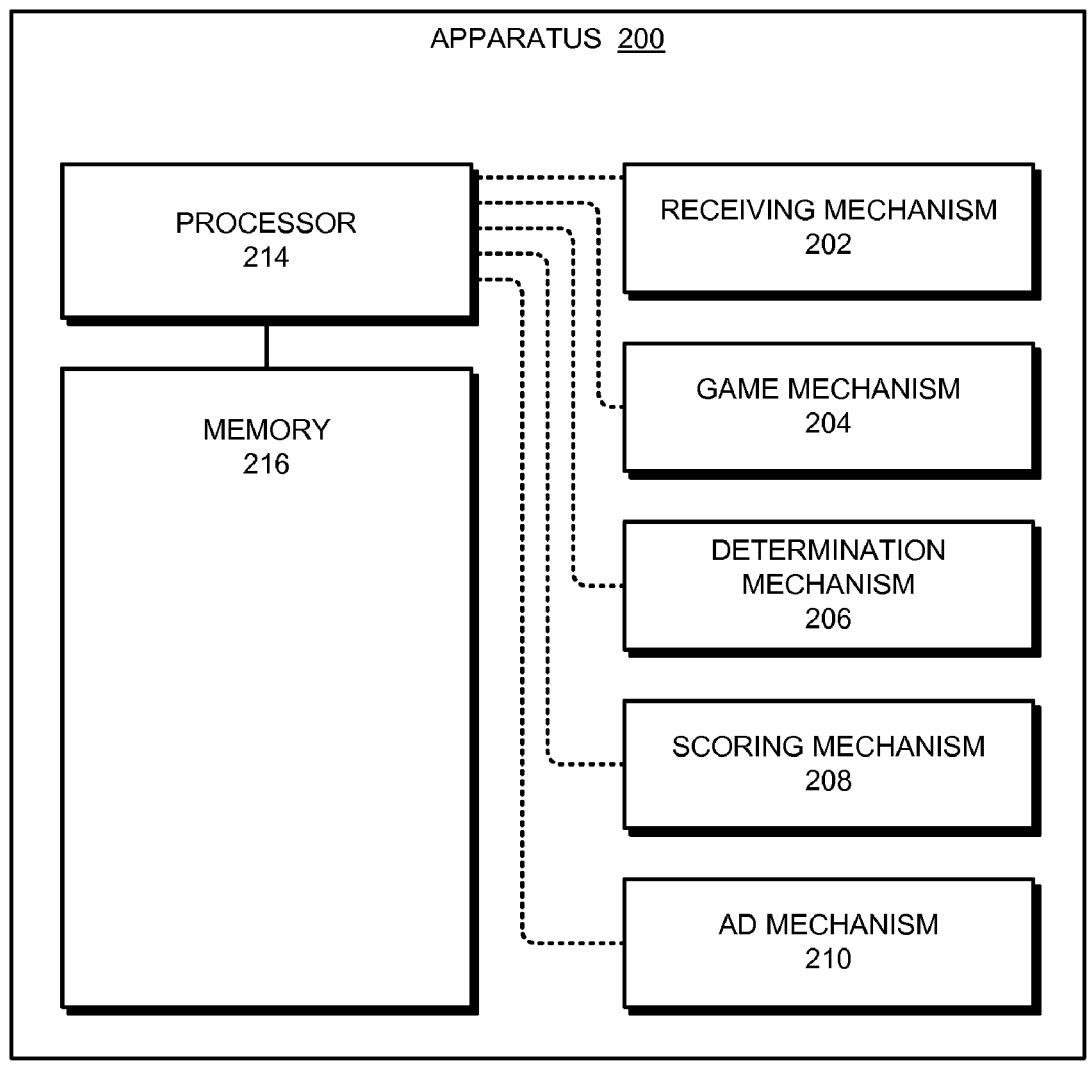
FIG. 2 illustrates an apparatus in accordance with an embodiment of the present invention.
Figure 3:
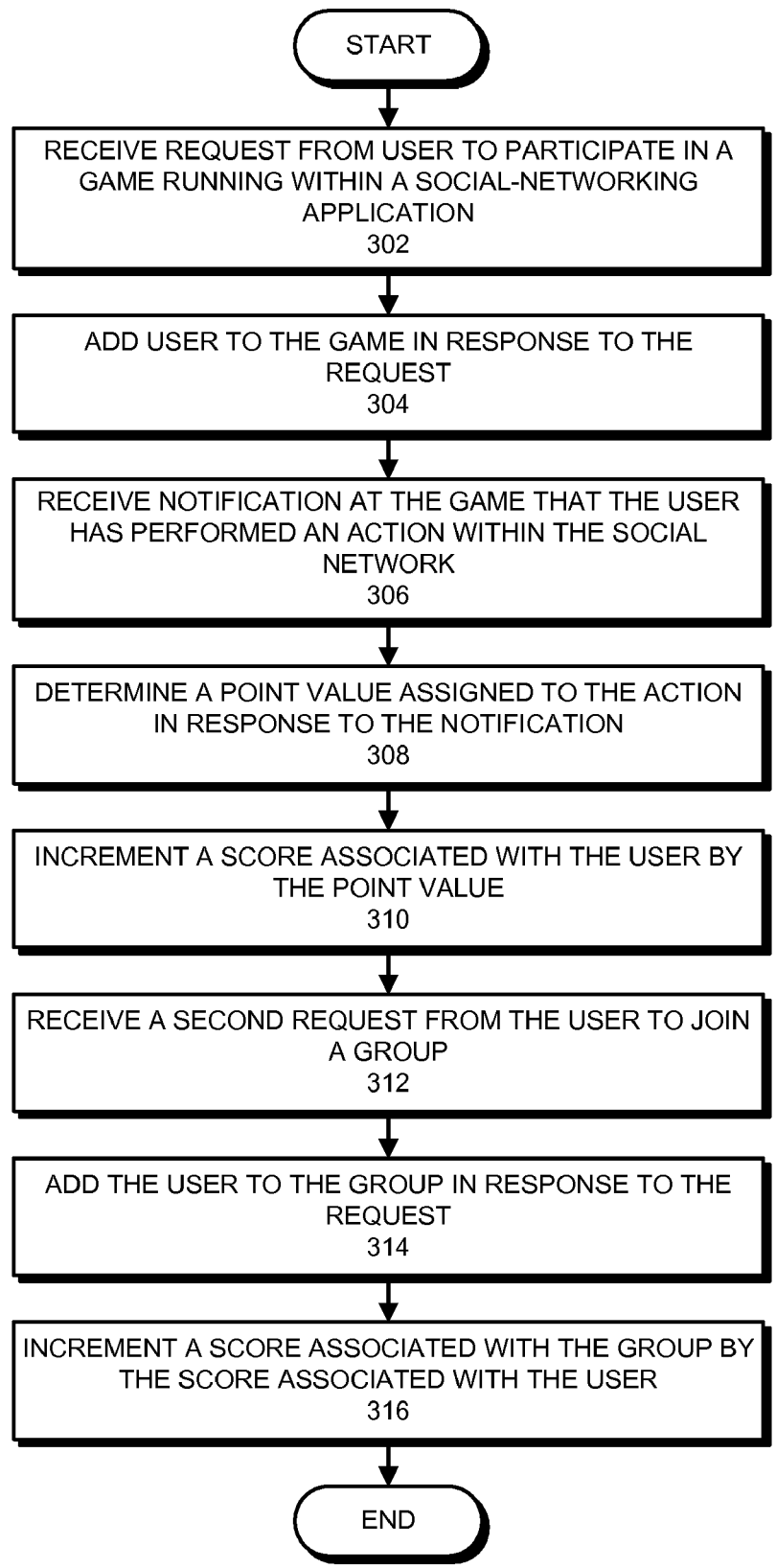
FIG. 3 presents a flow chart illustrating the process of facilitating a game that operates within a social-networking application in accordance with an embodiment of the present invention.

FIG. 2 illustrates an apparatus 200, and FIG. 3 presents an associated flow chart illustrating the process of facilitating a game that operates within a social-networking application in accordance with an embodiment of the present invention.

Apparatus 200, which for example can comprise server 150, database 170, appliance 190, client 110, devices 180, or any combination thereof, includes receiving mechanism 202, game mechanism 204, determination mechanism 206, scoring mechanism 208, ad mechanism 210, processor 214, and memory 216.

During operation, receiving mechanism 202 receives a request from user 120 to participate in a game that is running within the social-networking application (operation 302), wherein the request is received at the game. Next, game mechanism 204 adds the user to the game in response to the request (operation 304).

During the operation of the game, receiving mechanism 202 receives a notification at the game that user 120 has performed an action within the social network (operation 306). Next, determination mechanism 206 determines a point value assigned to the action in response to the notification (operation 308). Finally, scoring mechanism 208 increments a score associated with user 120 by the point value (operation 310).

In some embodiments of the present invention, user 120 must participate in a group in order to participate in the game. In these embodiments, receiving mechanism 202 receives a second request from user 120 to join a group (operation 312). Next, game mechanism 204 adds user 120 to the group in response to the second request (operation 314). Finally, scoring mechanism 208 increments a score associated with the group by the score associated with user 120, such that the score associated with the group is a sum of the scores associated with all of the users in the group (operation 316).

Note that ad mechanism 210 may present ads to user 120 during the course of the game. If user 120 clicks on the ads, user 120 will generate points for herself and for her group. Additionally, ad mechanism 210 can present user 120 and user 120's group with discounts on products in response to obtaining certain scores or a certain rank within the game.

Exemplary Screenshots

FIGS. 4A-4E present exemplary screenshots of a game operating within a social-networking application in accordance with an embodiment of the present invention. Note that while these screenshots illustrate a game operating within Facebook, any social-networking application can be used with embodiments of the present invention. Facebook is used for exemplary purposes only.

Figure 4A:
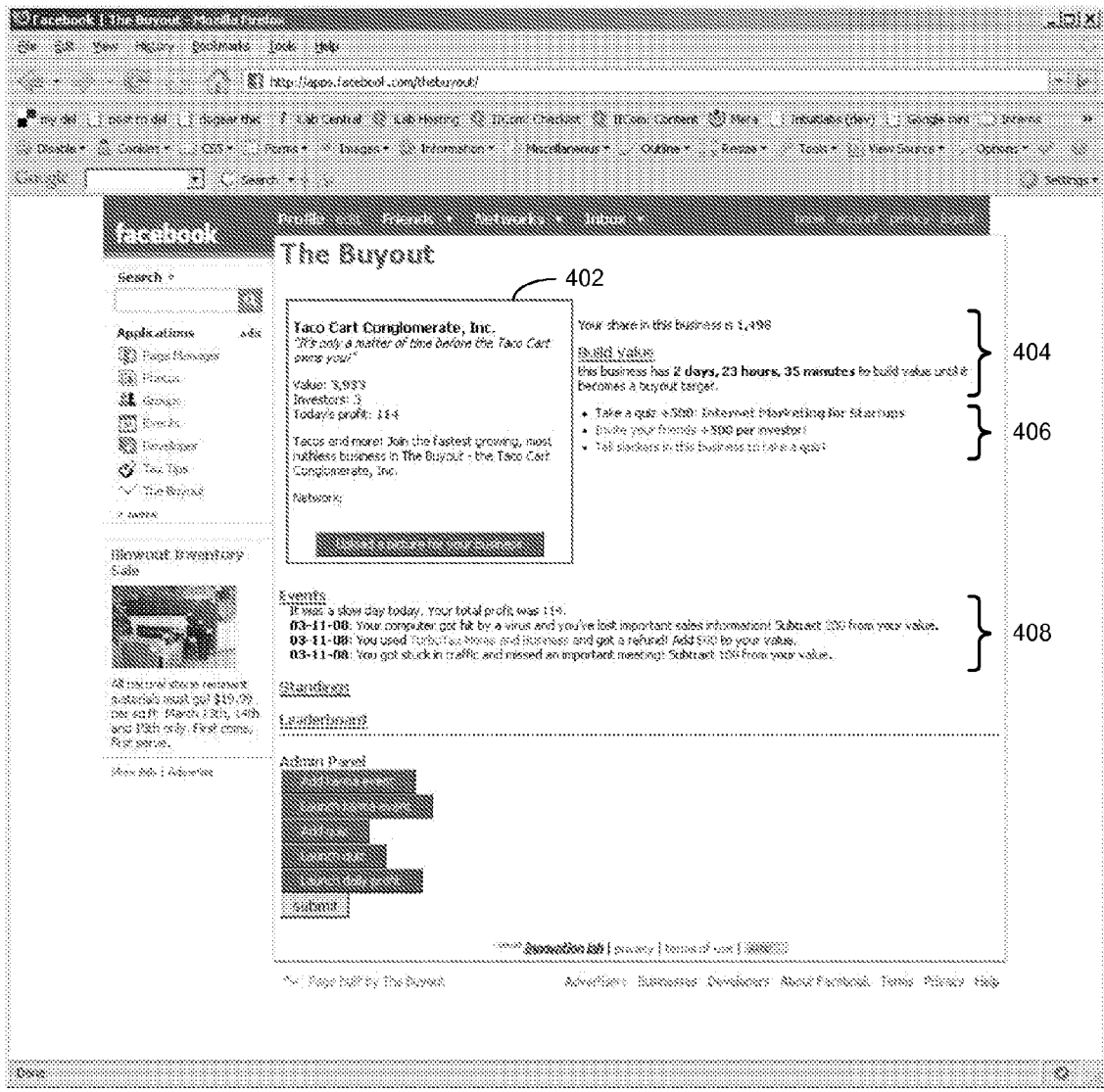
FIGS. 4A-4E present exemplary screenshots of a game operating within a social-networking application in accordance with an embodiment of the present invention.

As illustrated in FIG. 4A, user 120 is participating in a game entitled "The Buyout." During the course of this game, user 120 has joined a group called the "Taco Cart Conglomerate, Inc." Note that in this game, groups are organized as companies, and companies can buy out other companies by increasing the value of their company by some predetermined threshold over the value of the company that they would like to take over. Furthermore, a company must increase its value to avoid being taken over by other companies.

Box 402 illustrates a company's vital statistics. In this example, Taco Cart Conglomerate, Inc.'s value (the total points for all of the users that are part of Taco Cart Conglomerate, Inc.) is 3,933. Furthermore, Taco Cart Conglomerate, Inc. has three investors (members) and has generated 114 profit (points) today.

Status 404 shows user 120's contribution to the Taco Cart Conglomerate, Inc., as well as the takeover deadline initiated by another company/group.

Actions 406 comprises a list of actions that user 120 can take to increase the value of the Taco Cart Conglomerate, Inc. to avoid being taken over. For example, user 120 may click on the link to take a quiz that will result in an increase of value of 500 points for the Taco Cart Conglomerate, Inc.

Events 408 comprises a list of the most recent events that added value to the Taco Cart Conglomerate, Inc. Note that this list can be configured to show all of the events that added value to the Taco Cart Conglomerate, Inc., or only those events associated with user 120. In some embodiments of the present invention, events 408 is a list of random events that have happened to user 120 and the Taco Cart Conglomerate, Inc. Note that these events can include negative events that decrease the value of the Taco Cart Conglomerate, Inc.

Figure 4B:
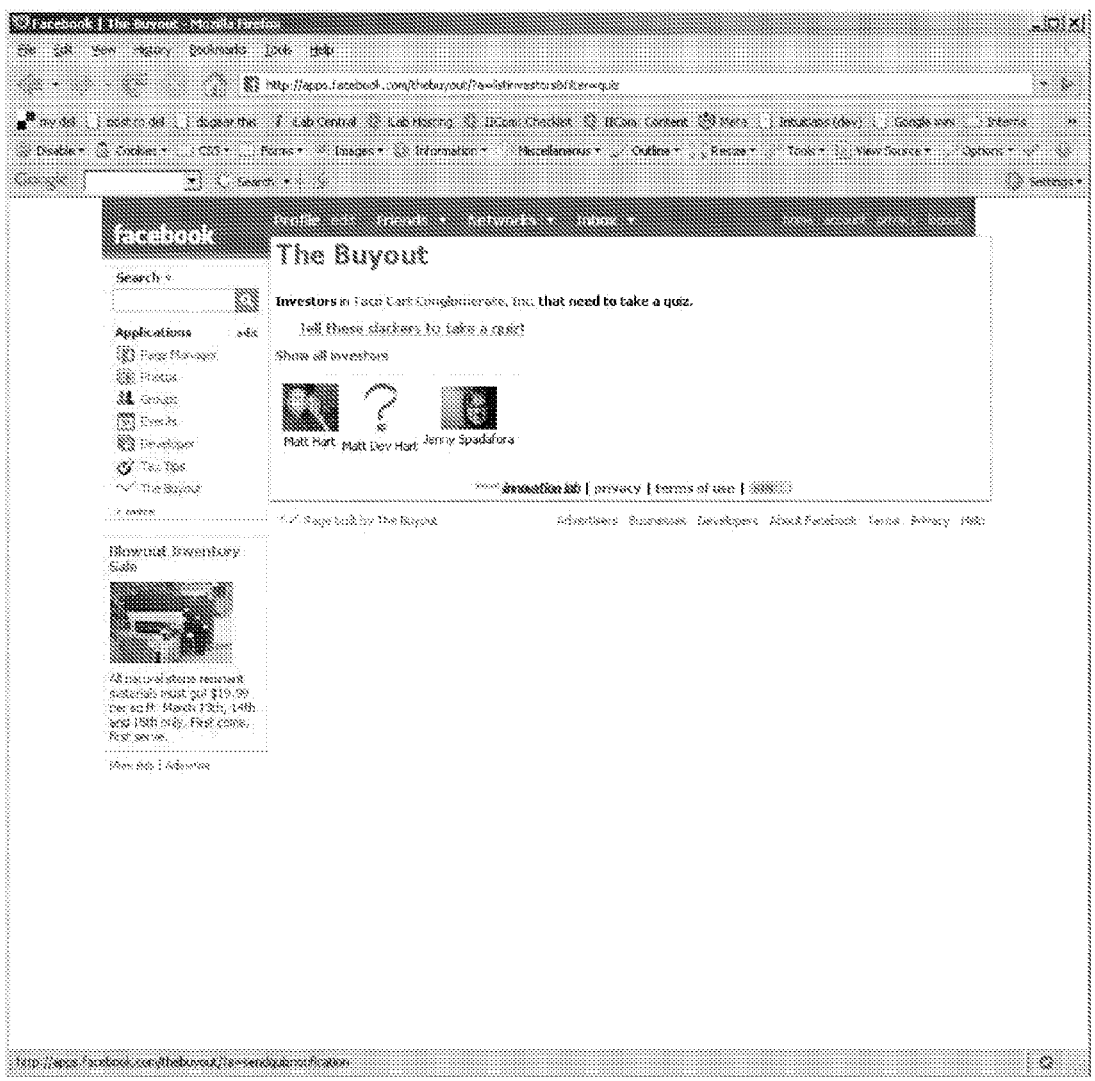

As illustrated in FIG. 4B, user 120 may view a listing of all investors of the Taco Cart Conglomerate, Inc. User 120 may click on a user to view his or her profile and contribution to the Taco Cart Conglomerate, Inc., as well as send a quick message to these users motivating them to take an action to increase the value of the Taco Cart Conglomerate, Inc.

Figure 4C:
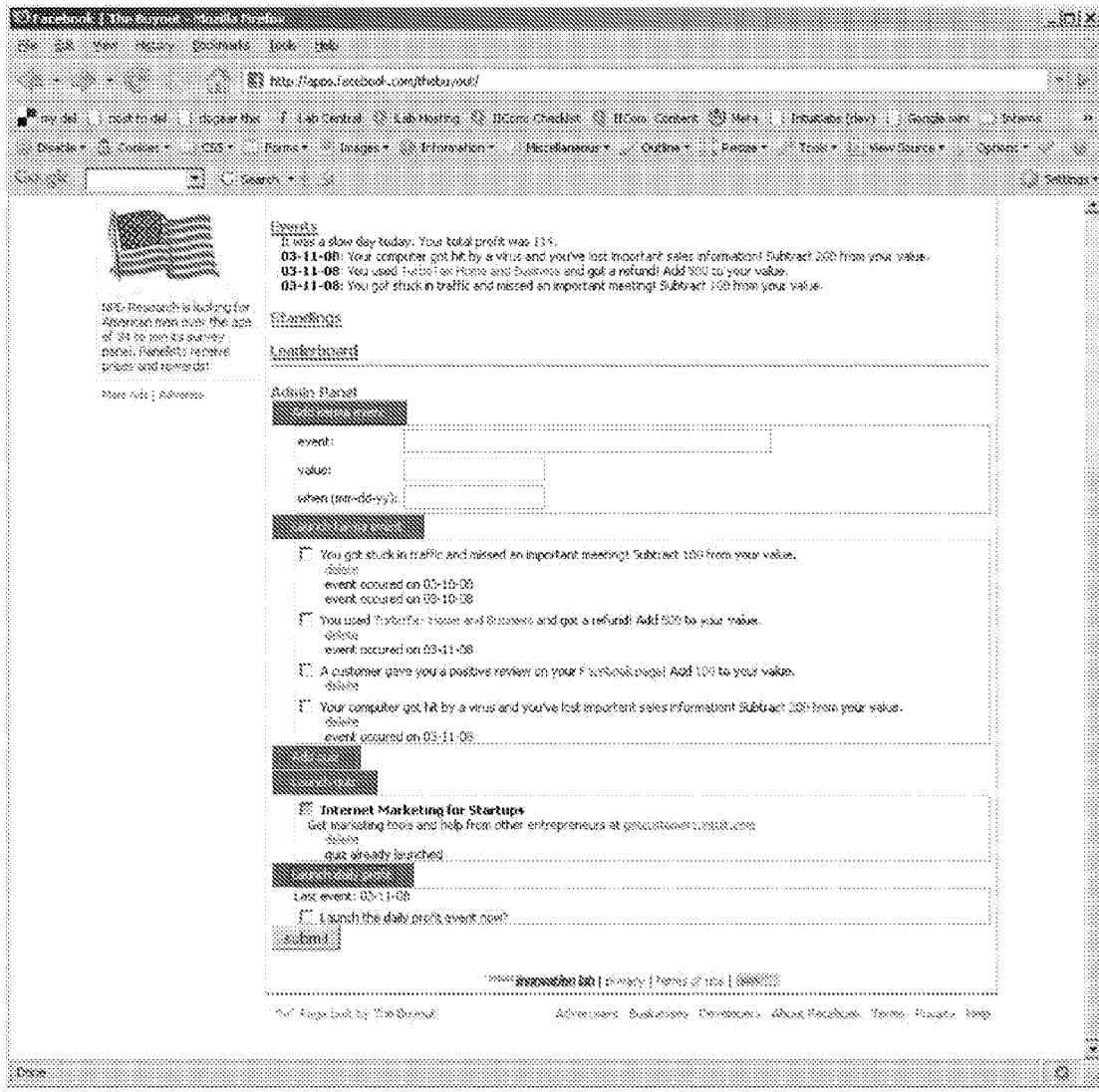

FIG. 4C illustrates an administration panel, wherein an administrator can schedule random events to affect the players and their corporations, as well as create quizzes and assign point values to actions.

Figure 4D:
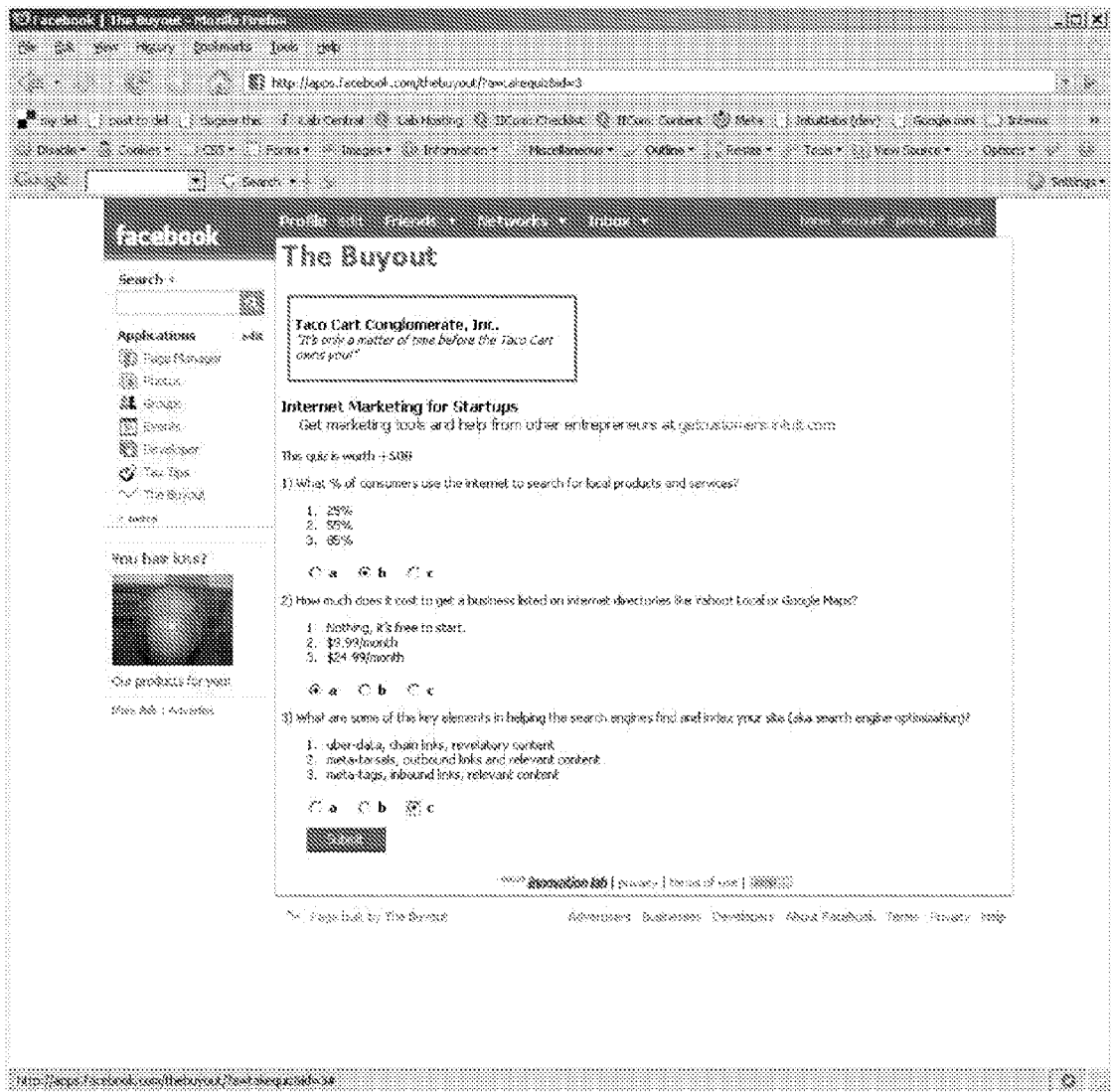
Figure 4E:
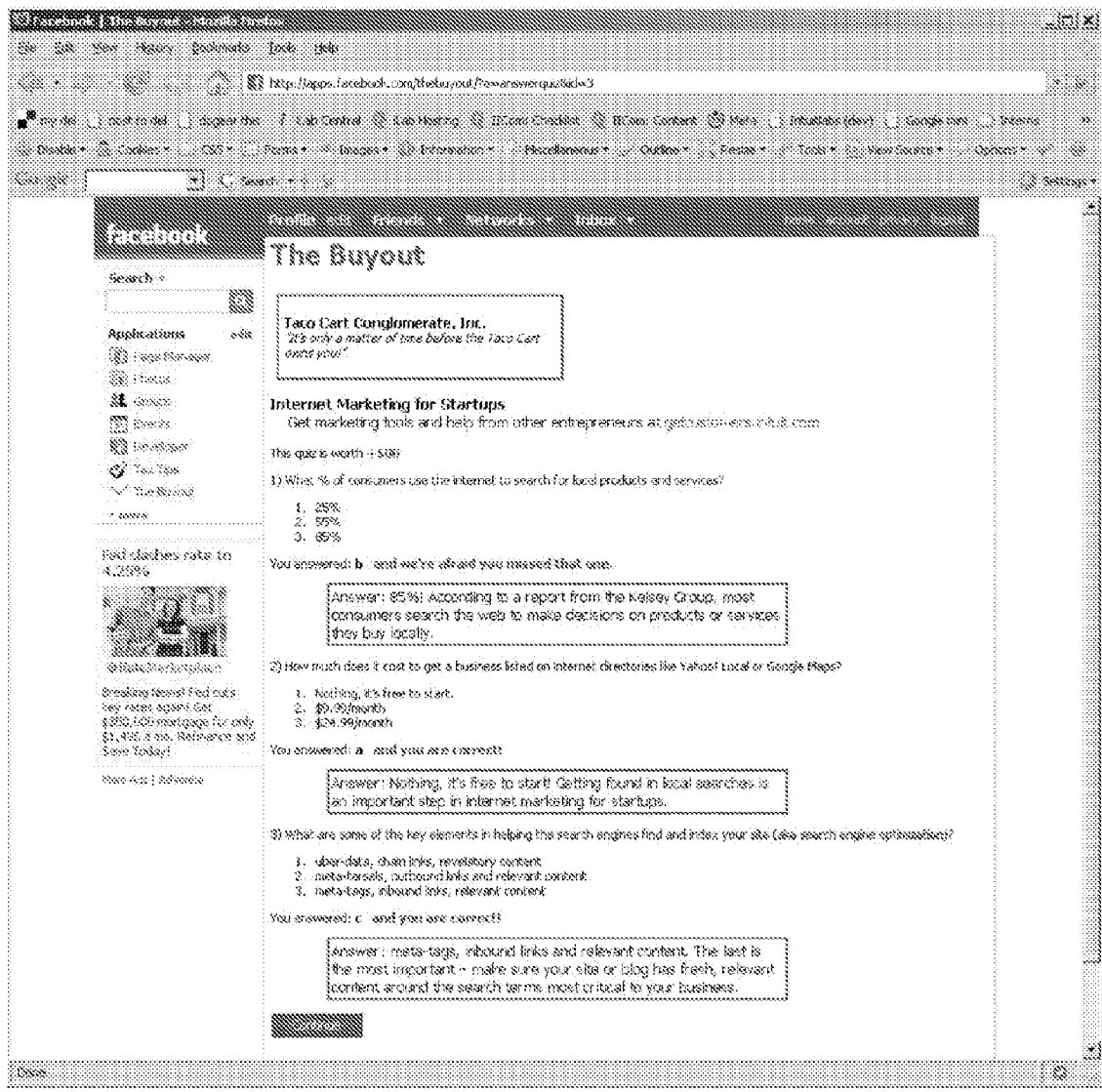

FIGS. 4D and 4E illustrate a quiz that user 120 can take to increase the value of the Taco Cart Conglomerate, Inc. Note that the quiz can be a directed marketing quiz pertaining to a product or company outside of the social-networking application. User 120 may receive the entire value of the quiz for participating, or may receive a prorated value on the quiz based on his or her performance on the quiz. For example, if user 120 got 90% of the questions correct, user 120 may receive 90% of the total value of the quiz.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for facilitating a game that operates within a social-networking application, the method comprising:
using a computer to receive a request from a user to participate in a game that is running within the social-networking application, wherein the request is received at the game;
in response to the request, adding the user to the game;
receiving a notification at the game that the user has performed an action within the social network;
in response to the notification, determining a point value assigned to the action;
incrementing a score associated with the user by the point value;
receiving a takeover request from the user at the game, wherein the takeover request specifies a group that includes the user and a target group that includes one or more users;
determining if the group meets a takeover criteria, wherein determining if the group meets the takeover criteria comprises determining if a score associated with the group exceeds a takeover score which is comprised of a score associated with the target group incremented by a predetermined threshold;
if so, combining the group and the target group within the social-networking application; and
if not, rejecting the takeover request.

2. The method of claim 1, further comprising:
receiving a second request from the user at the game to join the group;
in response to the second request, adding the user to the group; and
incrementing a score associated with the group by the score associated with the user, such that the score associated with the group is a sum of the scores associated with all of the users in the group.

3. The method of claim 1, wherein determining if the group meets the takeover criteria further involves:
creating a takeover deadline;
notifying members of the target group of: the takeover request, the takeover score, and the takeover deadline; and
determining if the score associated with the target group is below the takeover score at the takeover deadline.

4. The method of claim 1, further comprising periodically ending the game and starting a new game by resetting the score associated with the user, and eliminating a group membership of the user.

5. The method of claim 1, further comprising carrying over a percentage of the score associated with the user from the game to the new game.

6. The method of claim 1, wherein the action can include viewing an advertisement.

7. The method of claim 1, further comprising:
determining if the score associated with the user has reached a predetermined amount; and
if so, presenting the user with a discount on a product outside of the game.

8. The method of claim 1, further comprising:
determining if the score associated with the user has reached a predetermined rank compared to scores associated with other users; and
if so, presenting the user with a discount on a product outside of the game.

9. A non-transitory computer-readable storage medium storing instructions that when executed by a computer cause the computer to perform a method for facilitating a game that operates within a social-networking application, the method comprising:
receiving a request from a user to participate in a game that is running within the social-networking application, wherein the request is received at the game;
in response to the request, adding the user to the game;
receiving a notification at the game that the user has performed an action within the social network;
in response to the notification, determining a point value assigned to the action;
incrementing a score associated with the user by the point value;

receiving a takeover request from the user at the game, wherein the takeover request specifies a group that includes the user and a target group that includes one or more users;

determining if the group meets a takeover criteria, wherein determining if the group meets the takeover criteria comprises determining if a score associated with the group exceeds a takeover score which is comprised of a score associated with the target group incremented by a predetermined threshold;

if so, combining the group and the target group within the social-networking application; and if not, rejecting the takeover request.

10. The computer-readable storage medium of claim 9, wherein the method further comprises:

receiving a second request from the user at the game to join the group;

in response to the second request, adding the user to the group; and incrementing a score associated with the group by the score associated with the user, such that the score associated with the group is a sum of the scores associated with all of the users in the group.

11. The computer-readable storage medium of claim 9, wherein determining if the group meets the takeover criteria further involves:

creating a takeover deadline;

notifying members of the target group of: the takeover request, the takeover score, and the takeover deadline; and determining if the score associated with the target group is below the takeover score at the takeover deadline.

12. The computer-readable storage medium of claim 9, wherein the method further comprises periodically ending the game and starting a new game by resetting the score associated with the user, and eliminating a group membership of the user.

13. The computer-readable storage medium of claim 9, wherein the method further comprises carrying over a percentage of the score associated with the user from the game to the new game.

14. The computer-readable storage medium of claim 9, wherein the action can include viewing an advertisement.

15. The computer-readable storage medium of claim 9, wherein the method further comprises:

determining if the score associated with the user has reached a predetermined amount; and if so, presenting the user with a discount on a product outside of the game.

16. The computer-readable storage medium of claim 9, wherein the method further comprises:

determining if the score associated with the user has reached a predetermined rank compared to scores associated with other users; and if so, presenting the user with a discount on a product outside of the game.

17. An apparatus configured for facilitating a game that operates within a social-networking application, the apparatus comprising:

one or more computers that perform operations for:

a receiving mechanism configured to receive a request from a user to participate in a game that is running within the social-networking application, wherein the request is received at the game;

a game mechanism configured to add the user to the game in response to the request;

wherein the receiving mechanism is further configured to receive a notification at the game that the user has performed an action within the social network;

a determination mechanism configured to determine a point value assigned to the action in response to the notification;

a scoring mechanism configured to increment a score associated with the user by the point value;

a takeover mechanism configured to receive a takeover request from the user at the game, wherein the takeover request specifies a group that includes the user and a target group that includes one or more users; and a takeover-determination mechanism configured to determine if the group meets a takeover criteria, wherein determining if the group meets the takeover criteria comprises determining if a score associated with the group exceeds a takeover score which is comprised of a score associated with the target group incremented by a predetermined threshold;

wherein, if the group meets the takeover criteria, the takeover-determination mechanism is configured to combine the group and the target group within the social-networking application, and, if not, the takeover-determination mechanism is configured to reject the takeover request.

18. The apparatus of claim 17:

wherein the receiving mechanism is further configured to receive a second request from the user at the game to join the group;

wherein the game mechanism is further configured to add the user to the group in response to the second request; and wherein the scoring mechanism is further configured to increment a score associated with the group by the score associated with the user, such that the score associated with the group is a sum of the scores associated with all of the users in the group.

* * * * *